US008694544B2

(12) United States Patent  
Demant et al.

(10) Patent No.: US 8,694,544 B2  
(45) Date of Patent: Apr. 8, 2014

(54) LAYERING CONCEPT FOR A REPOSITORY OF A USER INTERFACE FRAMEWORK FOR WEB APPLICATIONS

(75) Inventors: Hilmar Demant, Karlsdorf (DE); Sebastian Droll, Heidelberg (DE); Joachim Fitzer, Schriesheim (DE); Ioannis Grammatikakis, Maxdorf (DE); Jan Heiler, Walldorf (DE); Juergen Sattler, Wiesloch (DE); Frank Schertel, Mannheim (DE); Markus Viol, Walldorf (DE); Thorsten Weber, Mannheim (DE)

(73) Assignee: SAP AG, Walldorf (DE)

( * ) Notice: Subject to any disclaimer, the term of this patent is extended or adjusted under 35 U.S.C. 154(b) by 541 days.

(21) Appl. No.: 12/978,667

(22) Filed: Dec. 27, 2010

(65) Prior Publication Data  
US 2012/0166461 A1 Jun. 28, 2012

(51) Int. Cl.  
G06F 17/30 (2006.01)

(52) U.S. Cl.  
USPC ............................ 707/792; 717/108

(58) Field of Classification Search  
USPC .................... 707/792; 717/108, 109  
See application file for complete search history.

(56) References Cited

U.S. PATENT DOCUMENTS

| 2004/0015858 A1* | 1/2004 | Seto et al. ............ 717/120 |
| 2005/0144226 A1* | 6/2005 | Purewal ............... 709/203 |
| 2005/0198615 A1* | 9/2005 | Choi et al. ........... 717/108 |
| 2006/0095892 A1* | 5/2006 | Banavar et al. ...... 717/109 |
| 2010/0058285 A1* | 3/2010 | Meijer et al. ........ 717/104 |
| 2012/0117141 A1* | 5/2012 | Beaver et al. ........ 709/203 |

* cited by examiner

Primary Examiner — Cheryl Lewis

(57) ABSTRACT

Various embodiments of systems and methods for a layering concept for a repository of a user interface framework for Web applications are described herein. The content of a repository provided by different parties (e.g., vendor, partner, customer, user, etc.) is separated. The separation is achieved by assigning solutions to the parties that store content in the repository. Simplified access to the repository is achieved by layering the solutions in a stack and implementing a layer strategy for the layers and their order of access.

14 Claims, 9 Drawing Sheets

LAYERING CONCEPT FOR A REPOSITORY OF A USER INTERFACE FRAMEWORK FOR WEB APPLICATIONS

FIELD

The field generally relates to the software arts, and more specifically, to methods and systems for a layering concept for a repository of a user interface framework for Web applications.

BACKGROUND

In the world of computing, Web applications such as Rich Internet Applications (RIAs) have many of the characteristics of desktop applications. The RIAs are typically delivered either by a site-specific browser, a browser plug-in, or independently via a virtual machine. The most commonly used frameworks that support such Web applications are Adobe Flash®, Java, and Microsoft Silverlight®. Generally, the framework has to be installed using the computer's operating system prior to launching the RIA. The Web application framework typically downloads, updates, verifies, and executes the RIA. Microsoft Silverlight® is a programmable Web browser plug-in that enables features such as animation, vector graphics and audio-video playback that characterize RIAs. Microsoft Silverlight® brings additional interactivity features and support for .NET® languages and development tools. It is compatible with multiple Web browser products. Microsoft Silverlight®, which was developed under the code-name Windows® Presentation Foundation/Everywhere (WPF/E), is a web-based subset of WPF.

Many Web application frameworks follow the Model View Controller (MVC) architectural pattern to separate the data model with the business logic from the user interface. The MVC pattern modularizes code, promotes code reuse (use of existing software code, or software knowledge, to build new software code), and allows multiple interfaces to be applied. The MVC architecture consists of a model, a view, and a controller. The model part of the MVC pattern is a domain-specific representation of the data upon which the application operates. Domain logic adds meaning to raw data (for example, calculating the totals, taxes, and shipping charges for shopping cart items). When a model changes its state, it notifies its associated views so they can refresh. The view of the MVC pattern renders the model into a form suitable for interaction, typically a user interface element. Multiple views can exist for a single model for different purposes. The controller of the MVC pattern receives input and initiates a response by making calls on model objects. When a Web application user interface framework is built on the MVC architectural pattern approach, high speed development of uniform user interfaces (UIs) is possible.

SUMMARY

Various embodiments of systems and methods for a layering concept for a repository of a user interface framework for Web applications are described herein. In an embodiment, the method includes receiving a request to obtain a data object from a repository, wherein the repository is organized in a set of layers, each layer implemented as a file system that stores content for a solution. The method further includes providing access to the repository based on a layer strategy, wherein the layer strategy includes a definition of at least one layer from the set of layers and a definition of a sequence access to the set of layers. Finally, the set of layers of the repository is searched for the data object based on the sequence access to the set of layers defined in the layer strategy.

In an embodiment, the system includes a processor and a memory in communication with the processor. The memory includes a repository organized in a set of layers, each layer implemented as a file system that manages content for a solution. The repository includes a personalization file system that stores personalization settings, a development file system that stores temporary content, which in response to activation is moved to a writable layer, and a list file system that includes the set of layers, wherein the set of layers are defined in a layer strategy.

These and other benefits and features of embodiments of the invention will be apparent upon consideration of the following detailed description of preferred embodiments thereof, presented in connection with the following drawings.

BRIEF DESCRIPTION OF THE DRAWINGS

The claims set forth the embodiments of the invention with particularity. The invention is illustrated by way of example and not by way of limitation in the figures of the accompanying drawings in which like references indicate similar elements. The embodiments of the invention, together with its advantages, may be best understood from the following detailed description taken in conjunction with the accompanying drawings.

DETAILED DESCRIPTION

Embodiments of techniques for a layering concept for a repository of a user interface framework for Web applications are described herein. In the following description, numerous specific details are set forth to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment", "this embodiment" and similar phrases, means that a particular feature, structure, or characteristic described in connection with the embodiment is included in at least one embodiment of the present invention. Thus, the appearances of these phrases in various places throughout this specification are not necessarily all referring to the same embodiment. Furthermore, the particular features, structures, or characteristics may be combined in any suitable manner in one or more embodiment.

Figure 1:
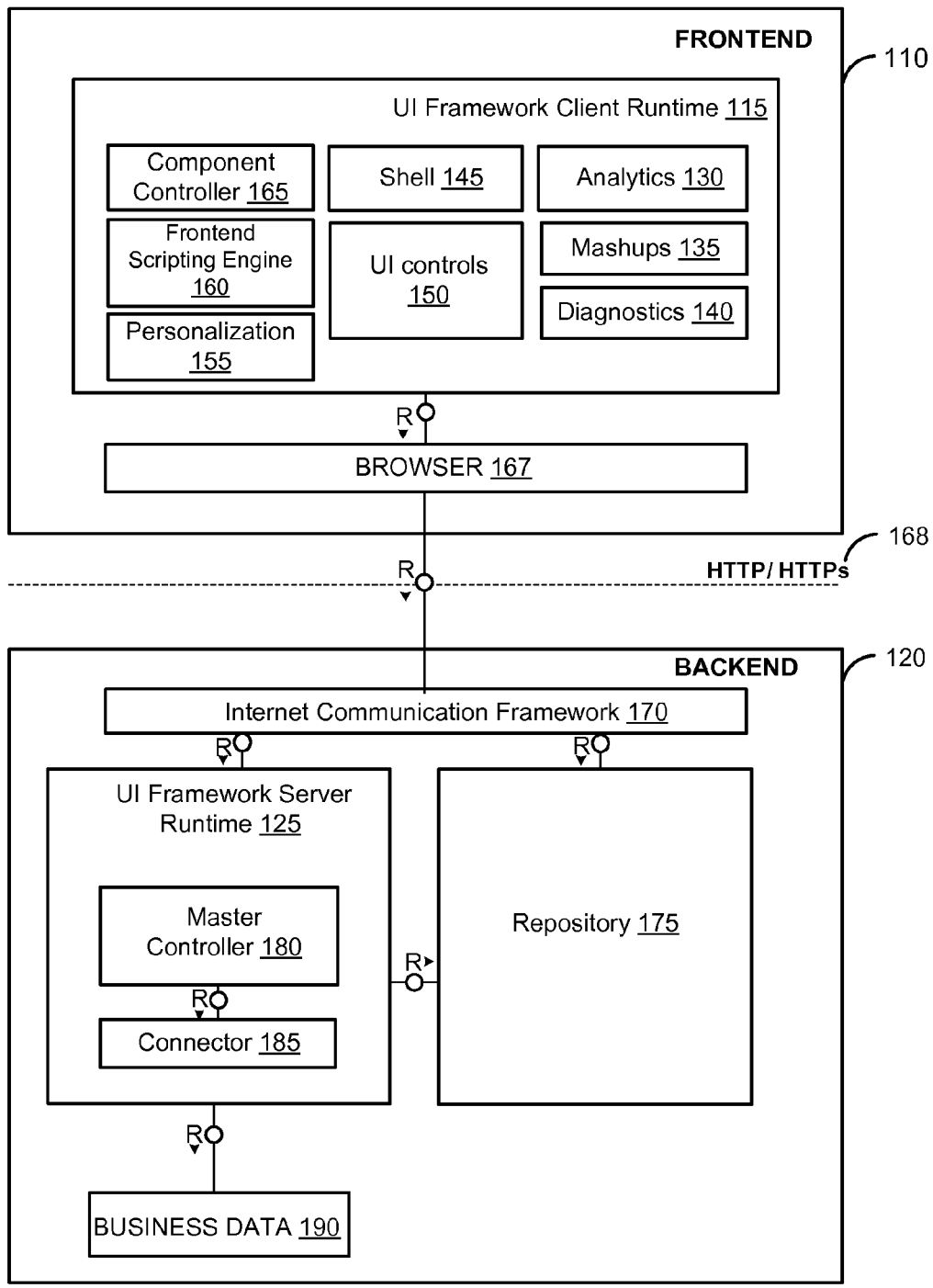
FIG. 1 is a block diagram illustrating an architectural view of a user interface framework as part of an application platform.

FIG. 1 is a block diagram illustrating an architectural view of a user interface framework as part of an application platform. The application platform is a Web application server including a frontend (client) part 110 and a backend (server) part 120. The UI framework as part of the application platform is responsible for modeling UIs at design time and interpreting them at runtime, so that there is no semantic loss by the generation from one model into another one. The UI framework enables the full separation of UI entities in multiple clients, provides a rendering-engine-independent definition of application UIs and has all the personalization and flexibility features built-in. The UI framework is based on the RIA concept, which removes the need of running Java server in the middle tier for application UI purposes. In this way, the complexity of the UIs is reduced significantly. The UI framework includes a client part—UI Framework Client Runtime 115, and a server part—UI Framework Server Runtime 125.

In one embodiment, the UI Framework Client Runtime 115 may be implemented in a programming language such as "C#" using a RIA based framework such as Microsoft Silverlight® technology. The UI Framework Client Runtime 115 is responsible for rendering user interfaces and accessing business data from backend 120. Every user request is triggered on the UI Framework Client Runtime 115. The very first request is a navigation request that results in a request to the backend 120 to read a UI component. The UI component is read from the Repository 175 in the backend 120 and transported to the frontend 110. A component manager instantiates the UI component and a corresponding component controller 165 for the UI component on the frontend 110 and triggers the initialization of the UI component on the backend 120. The component manager builds up a control tree for the UI component out of a set of UI controls 150. These UI controls 150 ensure conformable look and feel and the ability to change UI themes consistently. The controls in the "themed UI controls" package are all enabled in a consistent way for test automation and accessibility, and are provided in a manner so that native implemented custom UI panes can make use of those controls. Usually, more than one UI component is needed to render a UI, as UI components typically embed other UI components (e.g., a Work Center component embeds a set of Work Center View Components and they again embed other components). The top-level UI component that is rendered is the root UI component which ensures the rendering of a common frame for all UI components, e.g., by rendering the top level navigation and the ability for personalization from personalization unit 155.

In an embodiment, the UI Framework Client Runtime 115 also comprises the following built-in units: analytics 130, mashups 135, diagnostics 140, shell 145, and frontend scripting engine 160. Analytics 130 are components that represent data in a grouped, aggregated, and hierarchical way. These components serve to answer business questions about, for example, how many products were sold in a particular country and provide drill down capabilities to different levels of abstraction. Diagnostics 140 allows the collection of, for example, the context of the current framework and all other running entities of the overall system at a specific point in time (e.g., in case of an exception or error). The collected information can help to track down the cause of the exception. Shell unit 145 provides the shell for running the UI Framework Client Runtime. It includes all units for the user interface ranging from defining the overall appearance of windows (including standard elements such as menus, toolbars, navigation areas, windows management) as well as the mediator layer that maps logical component definitions from the configuration model to physical controls. In addition, there are possibilities to use a Silverlight® feature to run the client in "out of browser" mode. Also, a prototype exists to run the client as a standard WPF desktop client in contrast to the Silverlight® browser plug-in. This requires some replacement of connectivity and authorization code, which is provided by the browser stack itself. Frontend scripting engine 160 enables data from the client side data model to be read, evaluated, and modified—which eventually causes configured events again in the runtime execution of the model. With these capabilities, UI-only logic can be expressed and modeled via some script; it is not required to implement or model the logic in the backend. Optionally, the script can be executed on the client or backend.

The frontend 110 communicates with the backend 120 via browser 167 on a regular HTTP/HTTPs connection 168 using JavaScript Object Notation (JSON) (also, other serialization formats such as XML can be used in parallel to JSON) as a lightweight data interchange format. The requests from the frontend 110 are received at Internet Communication Framework (ICF) 170. The ICF 170 forwards the requests to the UI Framework Server Runtime 125 and Repository 175. The Repository 175 stores all UI entities with their metadata. The UI Framework Server Runtime 125 reads and interprets the UI model of the application, manages the access to the backend and ensures an optimized communication with the UI Framework Client Runtime 115. After the UI Framework Client Runtime 115 triggers the initialization of a UI component in the backend 120 for a first time in a session, the UI Framework Server Runtime 125 first creates a master controller 180 for the complete session and then creates a component controller for each component that is requested from the UI Framework Client Runtime 115. Each component controller builds a UI data container out of the information of the UI model for a component. At runtime, the composition of the dependent components is combined within the master controller 180, which holds one event queue and performs data updates for all included components as one component. In an embodiment, logically separated declared components can be configured to run as one virtual controller at runtime.

After the master controller 180 has processed all component controllers, it collects all the data that has changed in the UI data container and makes sure that all changed data and only the changed data is transported to the client 110. The access from the UI Framework Server Runtime 125 to business data 190 is performed via connector 185. Connector 185 is able to connect to different technologies.

Figure 2:
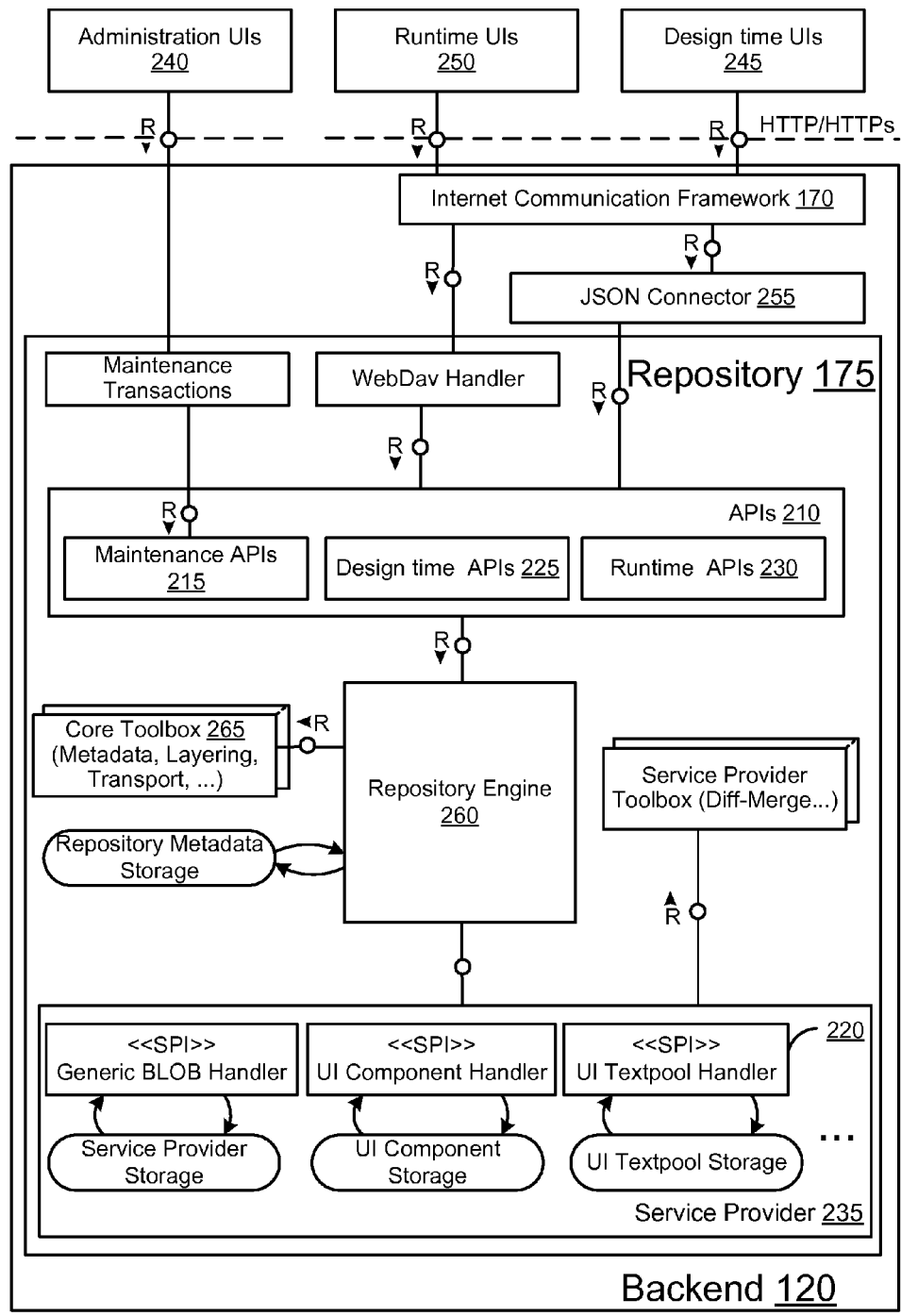
FIG. 2 is a block diagram illustrating the architecture of repository 175 in details.

FIG. 2 is a block diagram illustrating the architecture of repository 175 in details. Repository 175 represents a black box that uses application programming interfaces (APIs) 210 and service provider interfaces (SPIs) such as SPI 220. The APIs 210 include, but are not limited to, maintenance APIs 215, design time APIs 225, and runtime APIs 230. The design time APIs manipulate the repository content, the runtime APIs 230 that adapts the content for different functionalities (e.g., the text translation) and performs optimization of the content. The APIs 210 provide core functionalities on the content that is managed by the repository 175 and ensure a uniform access to the repository 175. The core functionalities include, but are not limited to: create, read, update, delete, query, transport, and so on. The content itself is not stored in a persistency unit that belongs to the core layer of the repository 175, but is only managed by the repository 175. The content and all actions performed on the content are handled by service provider 235 registered to the respective content types.

The service provider 235 is managed by the repository 175. For UI components, the service provider 235 is aware of the internal buildup of the entity. The structure of UI components may be described in an XML Schema Definition (XSD) format. A UI component consists of a model part, a controller part, and a view part. The model part contains the binding to the business objects and represents the data sources available in the UI. The controller part describes (special) UI logic and can contain/reference script coding (e.g., Ruby Script). The view part contains the UI elements and their layout. UI texts are language dependent and need to be mixed in according to the logon language of the user.

The service provider registry and all other metadata that belongs to the repository 175 are also exposed by the APIs 210, which are accessed through different clients. The repository 175 provides an option to expose text from the different content types into tables and other units of the framework to access the tables and handle the exposed text. For example, a translation unit can translate the text and when the translation is performed, the repository 175 handles the merging back of the text into the different content types via service calls. For example, some text can be defined in a user interface such as a title of a floor plan, the header of a section, etc., and this text is stored in a UI component, which is stored in the repository 175. A service provider implements the interfaces from the core repository layer. Using the implemented interface, the framework is notified that there is some text for translation available. The framework extracts the text in a separate table (or tables) and the translation process is performed. Once the translation is finished, the translated text is filled back in the table. Later, when the runtime requests that specific user interface, for which the text has been translated, to run, then the repository 175 has the feature to merge text in the appropriate language into the content and thus the content provides the translated UI back to the user.

The administration user interfaces 240 allow the users to manage and configure the repository 175 by actions such as registering service provider 235, creating solutions, creating projects, handling transport issues, and so on. The design time UIs 245 and the runtime UIs 250 communicate with the repository 175 via HTTP/HTTPs connections. The HTTP calls (get/post) are routed directly via JSON connector 255 to the repository APIs 210. The core part of repository 175 includes repository engine 260 and core toolbox 265. Core toolbox 265 is used by repository engine 260 to provide core functionalities such as: addressing/naming, layering, versioning, locking, transport handling, caching, etc. The core part of repository 175 is not aware of the semantics of its content, if the content is an image, a document, coding, a .dll file, and so on. The commonly needed core functionalities guarantee a fast and easy integration of different content types into the repository 175. Specific functionalities concerning the semantics of the content are handled by specialized service providers. A service provider (such as service provider 235) can be written and registered in the repository core to perform the handling of dedicated content types. The registered service provider can use the core toolbox 265 to implement their functionalities.

Figure 3:
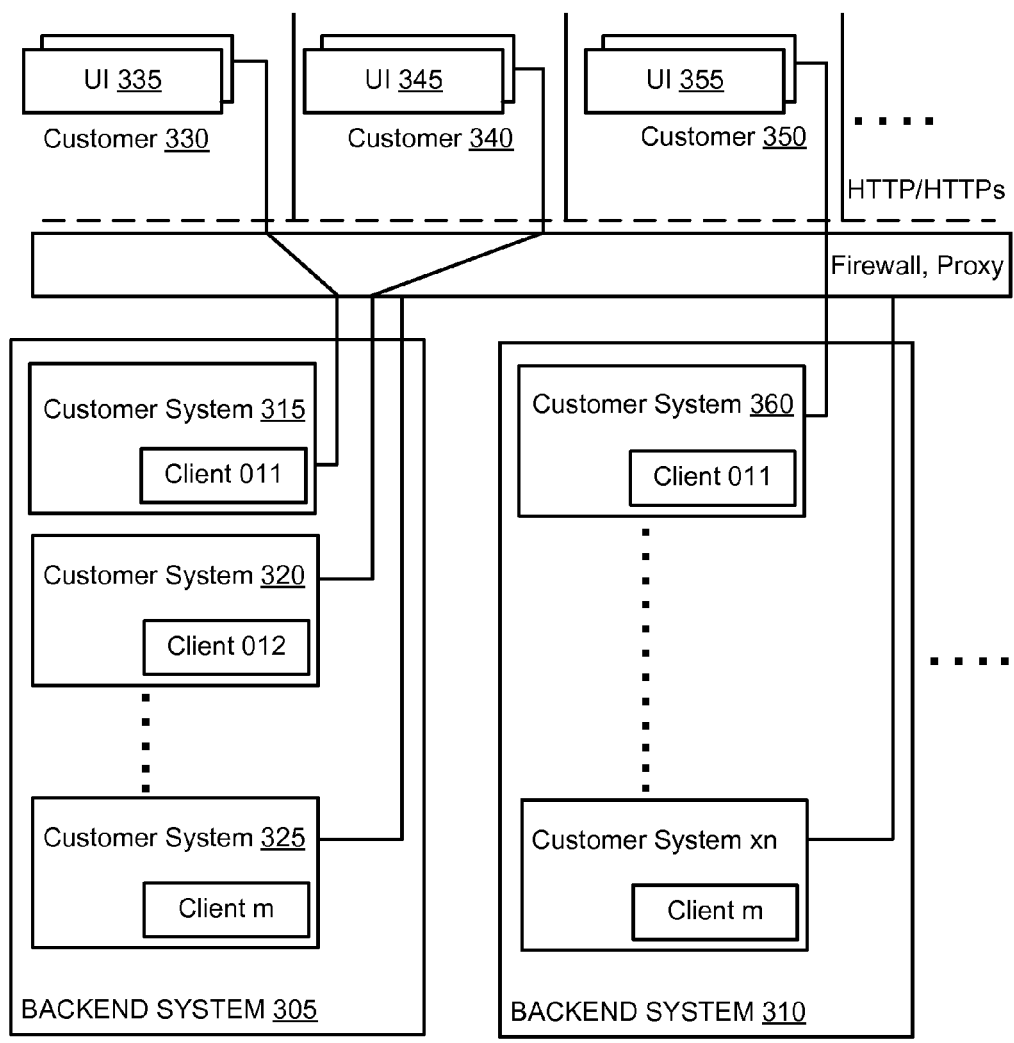
FIG. 3 is a block diagram illustrating multiple customer systems running on a backend system.

FIG. 3 is a block diagram illustrating multiple customer systems running on a backend system. In an embodiment, repository 175 provides support for multiple customer systems running on the same backend system, such as backend systems 305 and 310. Backend system 305 may host a set of customer systems including, but not limited to, systems 315, 320, and 325. Customers access the backend systems and the customer systems hosted on the backend via a frontend using user interfaces. In an embodiment, customer 330 accesses customer system 315 via user interfaces 335, customer 340 accesses customer system 320 via user interfaces 345, customer 350 accesses customer system 360 on backend system 310 via user interface 355, and so on. In this way, the administration costs for running the customer systems, backups, and so on are decreased as the same hardware can be used for all the customer systems. The repository that is part of a backend system, such as system 315, stores content for the customer systems running on the backend (e.g., 315, 320, 325, and so on) and for the user interfaces 335 that provide access to the backend.

Figure 4:
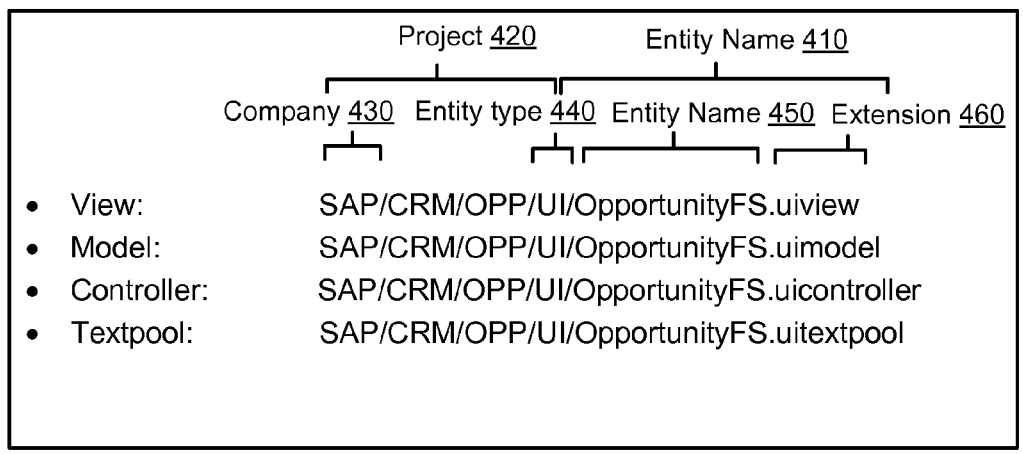
FIG. 4 is a block diagram illustrating the naming concept in the repository 175.

FIG. 4 is a block diagram illustrating the naming concept in the repository 175. The naming concept describes how entities are addressed in the repository 175. In an embodiment, the logical structure of an entity address can be defined as: <Project>/<EntityName>. Each entity name (e.g., entity name 410) may be assigned to one project (e.g., project 420). Projects are defined and maintained centrally and controlled by a governance process. A project is unique within a solution. All entities inherit the behavior of their project (e.g., source system). Technically, a project name can be structured (e.g., SAP/CRM/OPP/UI) as well as entity names (e.g., Images/image1.jpg). The necessity to allow a structuring in both, the project name and the entity name, is due to the different content types that need to be administered in the repository 175. For content such as Web site content, it is possible to store everything in one project. For structured content which is developed in different source system, it is necessary to have several projects. A project within a solution has one original system. The project 420 part of the entity address may include data such as a company name 430 and entity type 440. The entity name 410 part of the entity address may include the entity name 450 and extension 460 of the file. The entity types in the repository 175 may include the following: 1) for UI definitions—models, views, controllers, textpools; 2) for UI runtime entities—.xap files, user controls, images, and so on; 3) for UI design time—dll files, images, etc.; 4) for business configuration entities—schema definitions, transformations, scoping, scoping definitions, BC sets; 4) documentation entity types; 5) reports; 6) forms; etc.

In an embodiment, internal file systems may be implemented in the repository core to execute base operations such as put, get, and list of files. In repository 175, a file system that can be delivered or imported into a system is unique in the repository as identified with a globally unique identifier (GUID) and has type of "solution". The file systems include, but are not limited to, a default file system, a customer file system, a development file system, a personalization file system, list file system, layer strategy file system, all file system, and so on.

The default file system accesses the core header table of the repository 175; it is user and client independent. The default file system also provides the transport connection and lock mechanism. The customer file system is a special implementation of default file system. This file system accesses the client dependent header table. In the customer file system, all changes that belong to one customer are stored. The customer file system does not provide a transport mechanism, but a lock mechanism is available so that nobody from the same client is able to edit the same file concurrently. This type of a file system is used in a customer system. Customers are not allowed to modify any entities that belong to solutions of other partners. Modifying or extending entities is performed by using the relative URL of the entity for an own replacement of the entity.

The development file system is a default file system that is not created based on the user settings. This file system is always added by the core of the repository. The development file system accesses the client and the user dependent header table and acts as a work list during development. All content in this file system is temporarily stored and after activation will be moved into the next writable layer. This type of a file system does not provide a transport and a lock mechanism. Partners can deliver their own solutions, which can refer to other solutions. Partners are not allowed to modify any entities that belong to solutions of other partners. Modifying or extending entities is performed by using the relative URL of the entity for replacement of the entity.

Personalization file system is also user and client dependent; it stores the user specific changes. The personalization file system does not provide transport and locking mechanism too. The personalization file system does not store the content temporarily; the content is kept until it is removed explicitly. Users can personalize their UI (or the UI of special user groups) by creating their views or their texts in the appropriate file system. The list file system is a collection of all layers defined in the layer strategy table. This file system creates corresponding default or customer file systems based on the defined layer sequences. All operation calls that are delegated to the corresponding file system depend on the defined sequences and whether the layer is writable or not.

The layer strategy itself is also implemented as a file system internally. Layer strategy contains a list file system and two user-dependent file systems on top for development and personalization. Layer strategy just delegates all operations to the personalization, development, or list file system. Layer strategy file system can have two modes. One mode has personalization on top, then development file system and then list file system. Another mode has only development file system on top and then list file system. The mode with personalization is for the normal customer runtime environment, where the main change operations are for personalization. The mode without personalization is for the development design time environment, where a work list and corresponding states transition such as edit, create, save, and activation are required.

All file system is a special file system which only implements the read-only access. This file system represents the internal view of repository 175 without taking layer strategy settings into account. Solutions, branches and projects are displayed in the all file system.

The repository content may be stored by the repository core, repository engine 260 and core toolbox 265, and by the service provider 235. While the repository core stores administrative data, the service provider stores the actual content. User personalization data is stored into separate files to better support switch upgrades. In various embodiments, the repository content is arranged in branches as each branch may contain the complete set of a solution, such as a product, (a full branch) or only subsequently changed content (delta branches). Delta branches refer to a preceding branch. A layer in the repository is a view of one branch (including all preceding branches) of one solution. A layer strategy defines an ordered list of layers. Repository 175 uses the layer strategy as a search path from top to bottom when servicing content retrieval requests. The top-most entry of a layer strategy can be marked as writable. Repository 175 chooses the corresponding solution when serving change requests. Depending on the logon client different layer strategies can be used. In an embodiment, user-specific layer strategies may exist.

Figure 5:
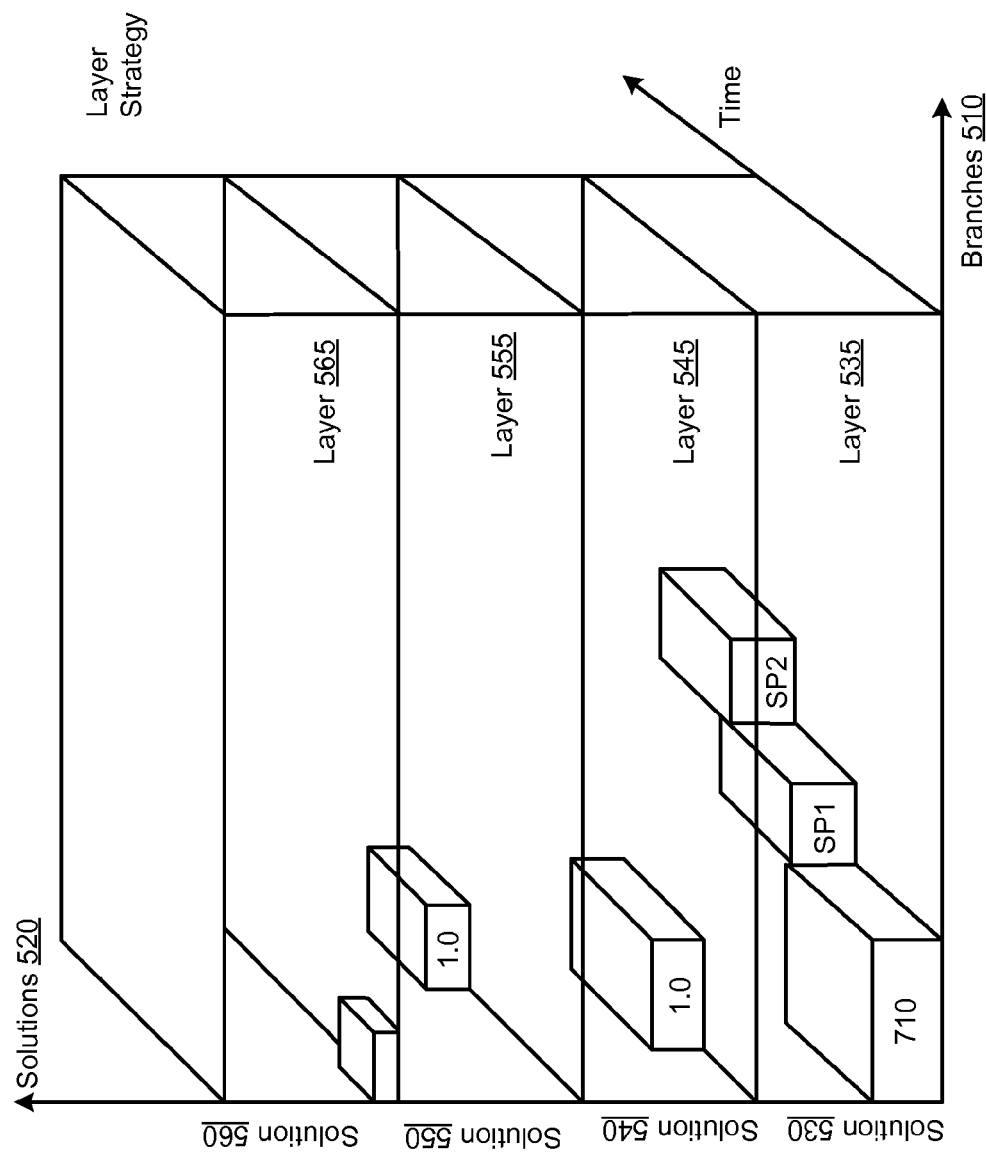
FIG. 5 is a block diagram illustrating the layering concept in the repository 175.

FIG. 5 is a block diagram illustrating the layering concept in the repository 175. In various embodiments, repository 175 separates content that is provided by different contributors such as users, partners, customers, and so on. The separation is achieved by assigning solutions to the parties that store content in the repository. The solution is the first primary key field in the related database tables of the repository. Simplified access to the repository 175 is achieved by layering (or stacking) solutions. In various embodiments, the order of solutions is the following: the bottom layer typically points to the solution provided by the vendor and on top of this there can be other layers pointing to solutions of the partner, the customer, the user, or any arbitrary other solution. The top-most layer is a user-specific layer that is supposed to be used for personalization. When searching for repository content, the layers are searched from top to bottom and the content that is found first is returned. Looking from outside, the several layered solutions look as if it is only one solution.

In various embodiments, the layers and their order must be configured manually in a layer strategy or by some management layer, e.g., that handles to switch on and off partner solutions to be used by the customer. User layers are added by the repository by default without the need for manual configuration. The top-most layer (the user-specific layer) of a strategy is marked as writable, while all layers below are read-only. In an embodiment, there can be only one layer in a strategy that is writable. FIG. 5 shows the layering concept for access to the repository 175 based on solutions by parties. The horizontal axis represents the branches 510 of a product (e.g., releases of a product, service patches, etc.), while the vertical axis represents the solutions 520. The solution 530 at the bottom layer 535 represents the solution provided by the vendor (e.g., SAP Business ByDesign® by SAP). Solution 540 represents the solution provided by the partner at layer 545. Solution 550 represents the solution provided by the customer at layer 555. Solution 560 represents the solution provided by the user at layer 565. Layer 565 is marked as writable, which means that the users have rights to change the content of solution 560 in the repository.

"Copy on write" (COW) operation on the content takes place whenever a change request comes in the repository (e.g., an XML file) that is assigned to a read-only layer. The COW operation exists as one optional mode—in this case the content "overshadows" the content from the lower layer. There is also the mode when a change is stored in the upper layer and also as delta information to the lower content (implicit merge logic provided by the framework). There is also a third mode, where the delta information (so called "change transaction") is stored separately and linked to the original content and merged semantically by the repository framework (explicit merge logic).

The content is copied to the writable layer (e.g., layer 565), while keeping a reference to the original content. Accordingly, "whiteout on delete" (WOD) operation marks content as deleted in the writable layer. Repository 175 offers explicit API methods for personalization changes, because it treats personalization changes different from development changes—especially with regard to software logistics and automatic "diff & merge" functionality (redoes changes performed to a file when a new version of that file comes in; this is done automatically without human interaction). Repository 175 adds user-specific layers automatically to the configured layer strategy. One layer is added for design time requests. When a developer activates the changes, the content of this layer is moved back to the layer below. For runtime requests, two layers are added: one for user-specific development and another one for personalization.

In various embodiments, layers and corresponding layer strategies can be defined. The layer strategy includes a stack of layers and a sequence with a precedence of the different layers. For example, layer 535 includes the solution provided by the vendor and one or more layers 545 that include solutions for different partners on top of layer 535, which refer to layer 535. Also, there is one or more layers for the customers (e.g., 555) and a plurality of layers for users including a layer for each user (e.g., layer 565). For a specific party (user, customer, partner, etc.), there is a layer strategy defined, which starts with the corresponding user layer for the party and points to the vendor layer. The vendor layer points to any sequence of partner layers, if there are any, and finally the vendor layer is referenced as the lowest layer. This stack of layers and the layer strategy, which can be different for different users and different clients or companies, can aggregate a view to the different content. This means that if a specific object is accessed by one user through the aggregation mechanisms of the repository 175, it may result in a different view of the entities than for another user or for another company, or partner, etc.

Semantic changes can be defined to an existing entity and that entity may be stored to any layer in the repository. For example, there may be an object instance in the solution provided by the vendor (e.g., solution 530) and a partner may want to bring additional fields to this object instance. The changes that the partner will perform are not stored within the vendor solution but are stored in a semantic description of this change in a small entity called change transaction, which describes the actual change (e.g., the additional fields to the object instance) in an abstract way. The change transaction is stored in the partner layer. Then, the repository has the feature that once this object instance is accessed, it knows that there are change transactions in the partner layer and if the partner layer is present in the current layer strategy of the request, then the change transaction will be merged into the object instance and a resulting view, as result of the merge, will be passed back as a response to the request. For atomization reasons, once the merge has happened, the result is stored in the partner layer of the repository and will be reapplied only if something is changed in the change transaction or in the underlying object (that is changed by the change transaction).

The layers stack and the layering strategy guarantee lifecycle stability. For example, there are different layers and a set of entities stored in the repository by a given solution. When an update of the solution is provided, the customer changes or the personalization settings to the layers are not lost but just they have been reapplied and remerged together with the newly content.

In some embodiments, the different releases of a solution are stored separately so that a switch between the releases is possible in case some data from an old release is needed. If the content in the repository 175 is shipped to customers and there is a new release, the new release is stored in parallel to the old release and the content of the old release is present to the customer, so that the customer is able to run the former release using the UIs of the new release.

Figure 6:
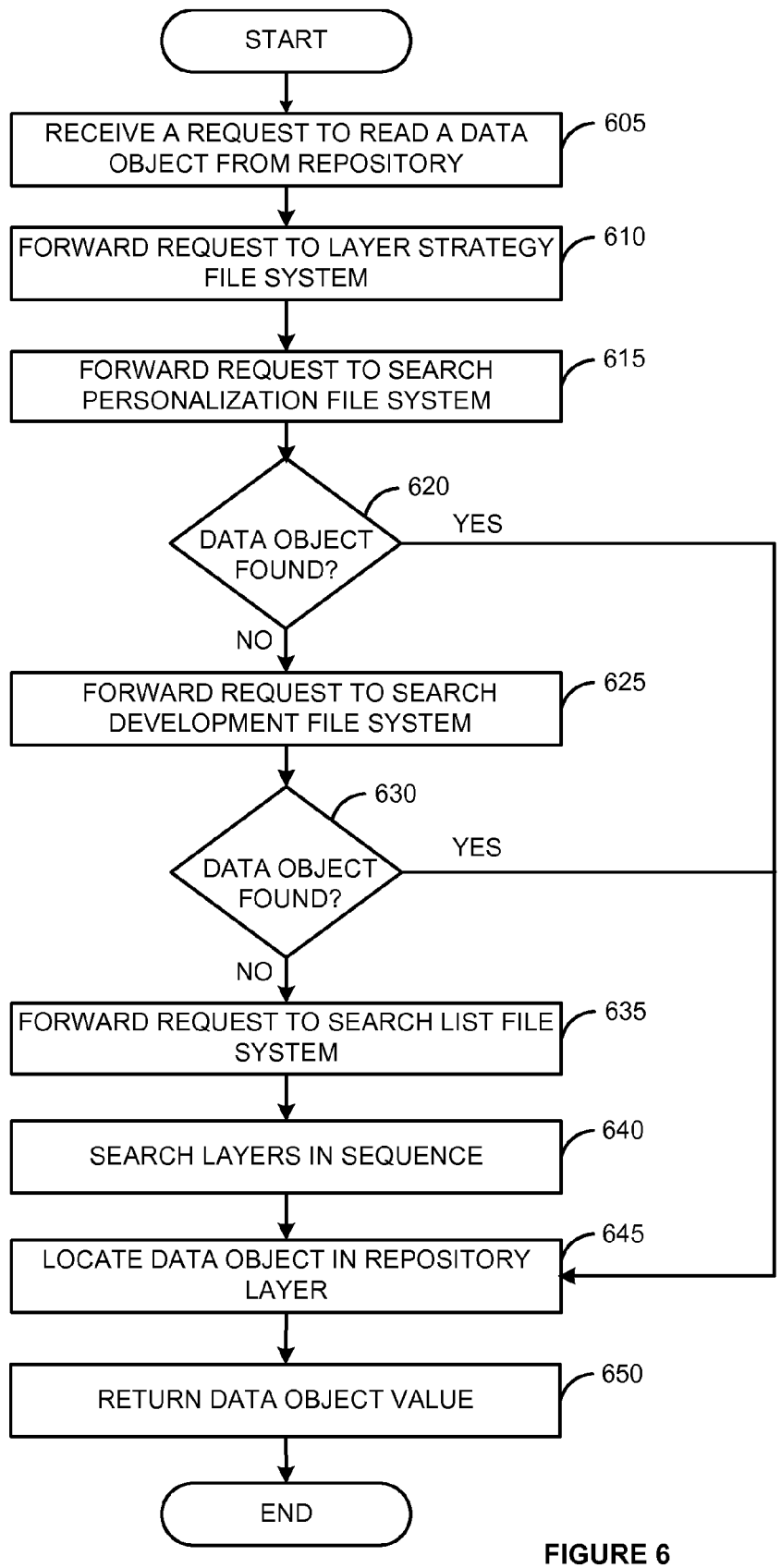
FIG. 6 is a flow diagram illustrating read access to the repository content based on the layering concept and the layer strategy.

FIG. 6 is a flow diagram illustrating read access to the repository content based on the layering concept and the layer strategy. During read access, the layer strategy will delegate the request to personalization, development and list file systems in a layered manner, meaning that the layers are searched from top to bottom and the content that is found first is returned. For example, first the request is sent to the personalization file system (as each layer is implemented as a file system), then to the development file system if not found in the personalization file system and lastly in the list file system if not found in the previous two file systems. The personalization file system and the development file system represent the personalization layer and the development layer accordingly. These two layers are added automatically by the repository for user specific settings. For runtime requests, both layers are added to the configured layer strategy. For design time requests, only the development layer is added.

At block 605, a request is received that requires a data object to be read from the repository during runtime. At block 610, the request is forwarded to the layer strategy file system. The layer strategy is implemented as an internal file system—the layer strategy file system. The layer strategy includes definitions of a set of layers and a definition of a sequence access to the layers with a precedence of the different layers. The sequence access represents a number that defines which layer has precedence to be accessed when searching the layers or when delegating an operation. The layer strategy file system contains a list file system and on top of it two user-dependent file systems: development file system and personalization file system.

At block 615, the request is forwarded to personalization file system to search and retrieve information for the data object. At decision block 620, it is checked if the data object is found in the personalization file system. If the result is "yes", then the method continues at block 645, otherwise at block 625. At block 625, the request is forwarded to development file system to search and retrieve information for the data object. At decision block 630, it is checked if the data object is found in the development file system. If the result is "yes", then the method continues at block 645, otherwise at block 635. At block 635, the request is forwarded to list file system to search and retrieve information for the data object. The list file system is a collection of all layers defined in the layer strategy. At block 640, the defined layers are searched in sequence according to the sequence access defined in the layer strategy. At block 645, the data object is located in a layer of the repository. At block 650, data object attribute value is returned in response to the initial request.

Figure 7:
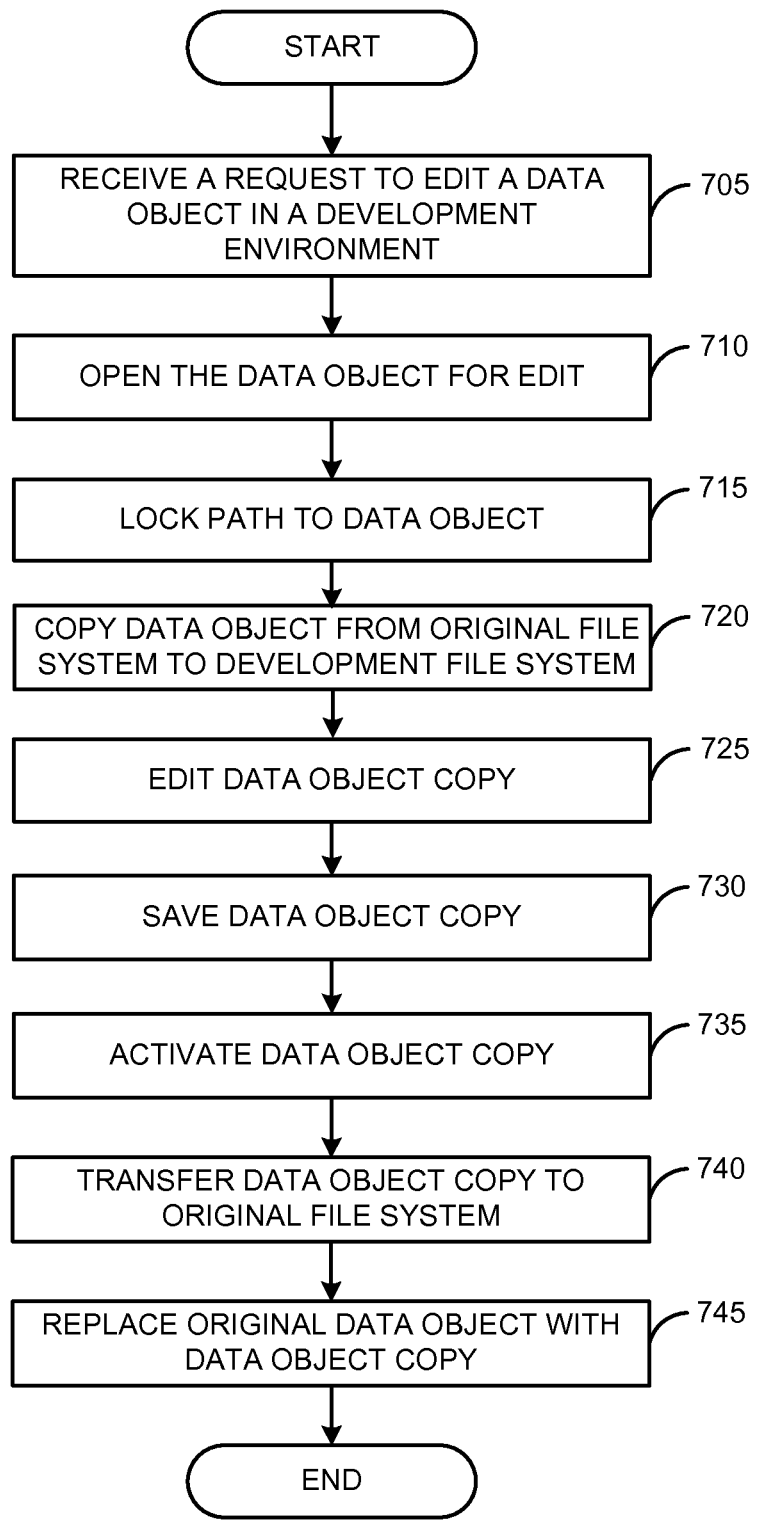
FIG. 7 is a flow diagram illustrating write access in development environment to the repository content based on the layering concept and the layer strategy.

FIG. 7 is a flow diagram illustrating write access in development environment to the repository content based on the layering concept and the layer strategy. At block 705, a request is received to edit a data object in the repository in a development environment (i.e., during design time). At block 710, the data object is opened (checked out) for editing in the development environment. In response to opening the data object for editing, at block 715, the path to the data object is locked, so that no other edit operation can be performed at the same time on this data object. At block 720, the data object is copied from the original file system hosting the data object to a development file system (using "copy on write" functionality). At block 725, the copy of the data object is edited in the development file system. At block 730, the edited copy of the data object is saved in the development file system. At block 735, the saved copy of the data object is activated in the development file system. At block 740, the copy of the data object is transferred from the development file system to the original file system. At block 745, the original data object is replaced with the data object copy.

Figure 8:
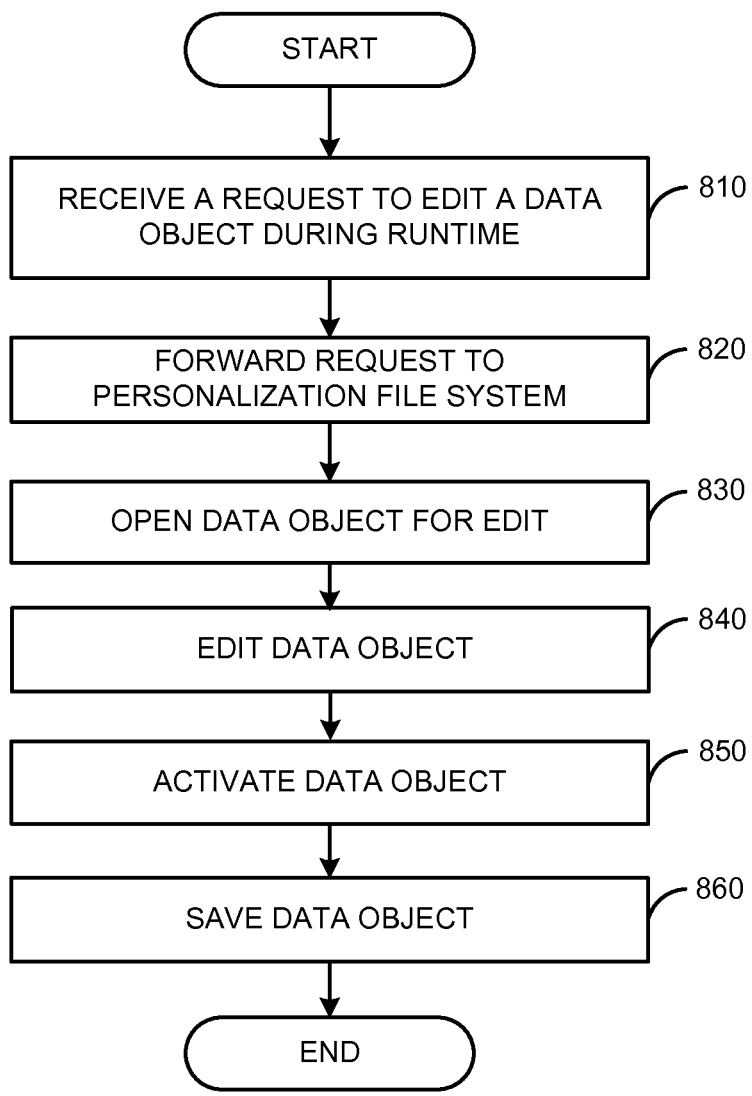
FIG. 8 is a flow diagram illustrating write access in runtime environment to the repository content based on the layering concept and the layer strategy.

FIG. 8 is a flow diagram illustrating write access in runtime environment to the repository content based on the layering concept and the layer strategy. Another use case of write access is the personalization in runtime environment, where the main edit operations are personalization. However, this type of write access is performed during runtime and the changes are made directly to the data. At block 810, a request is received to edit a data object in the repository during runtime. At block 820, the request is forwarded to the personalization file system by the layer strategy. At block 830, the data object is opened for edit in the personalization file system. At block 840, the data object is edited in the personalization file system. At block 850, the data object is activated and the data object with the performed changes is saved at block 860.

Some embodiments of the invention may include the above-described methods being written as one or more software components. These components, and the functionality associated with each, may be used by client, server, distributed, or peer computer systems. These components may be written in a computer language corresponding to one or more programming languages such as, functional, declarative, procedural, object-oriented, lower level languages and the like. They may be linked to other components via various application programming interfaces and then compiled into one complete application for a server or a client. Alternatively, the components maybe implemented in server and client applications. Further, these components may be linked together via various distributed programming protocols. Some example embodiments of the invention may include remote procedure calls being used to implement one or more of these components across a distributed programming environment. For example, a logic level may reside on a first computer system that is remotely located from a second computer system containing an interface level (e.g., a graphical user interface). These first and second computer systems can be configured in a server-client, peer-to-peer, or some other configuration. The clients can vary in complexity from mobile and handheld devices, to thin clients and on to thick clients or even other servers.

The above-illustrated software components are tangibly stored on a computer readable storage medium as instructions. The term "computer readable storage medium" should be taken to include a single medium or multiple media that stores one or more sets of instructions. The term "computer readable storage medium" should be taken to include any physical article that is capable of undergoing a set of physical changes to physically store, encode, or otherwise carry a set of instructions for execution by a computer system which causes the computer system to perform any of the methods or process steps described, represented, or illustrated herein. A computer readable storage medium may be a non-transitory computer readable storage medium. Examples of a non-transitory computer readable storage media include, but are not limited to: magnetic media, such as hard disks, floppy disks, and magnetic tape; optical media such as CD-ROMs, DVDs and holographic devices; magneto-optical media; and hardware devices that are specially configured to store and execute, such as application-specific integrated circuits ("ASICs"), programmable logic devices ("PLDs") and ROM and RAM devices. Examples of computer readable instructions include machine code, such as produced by a compiler, and files containing higher-level code that are executed by a computer using an interpreter. For example, an embodiment of the invention may be implemented using Java, C++, or other object-oriented programming language and development tools. Another embodiment of the invention may be implemented in hard-wired circuitry in place of, or in combination with machine readable software instructions.

Figure 9:
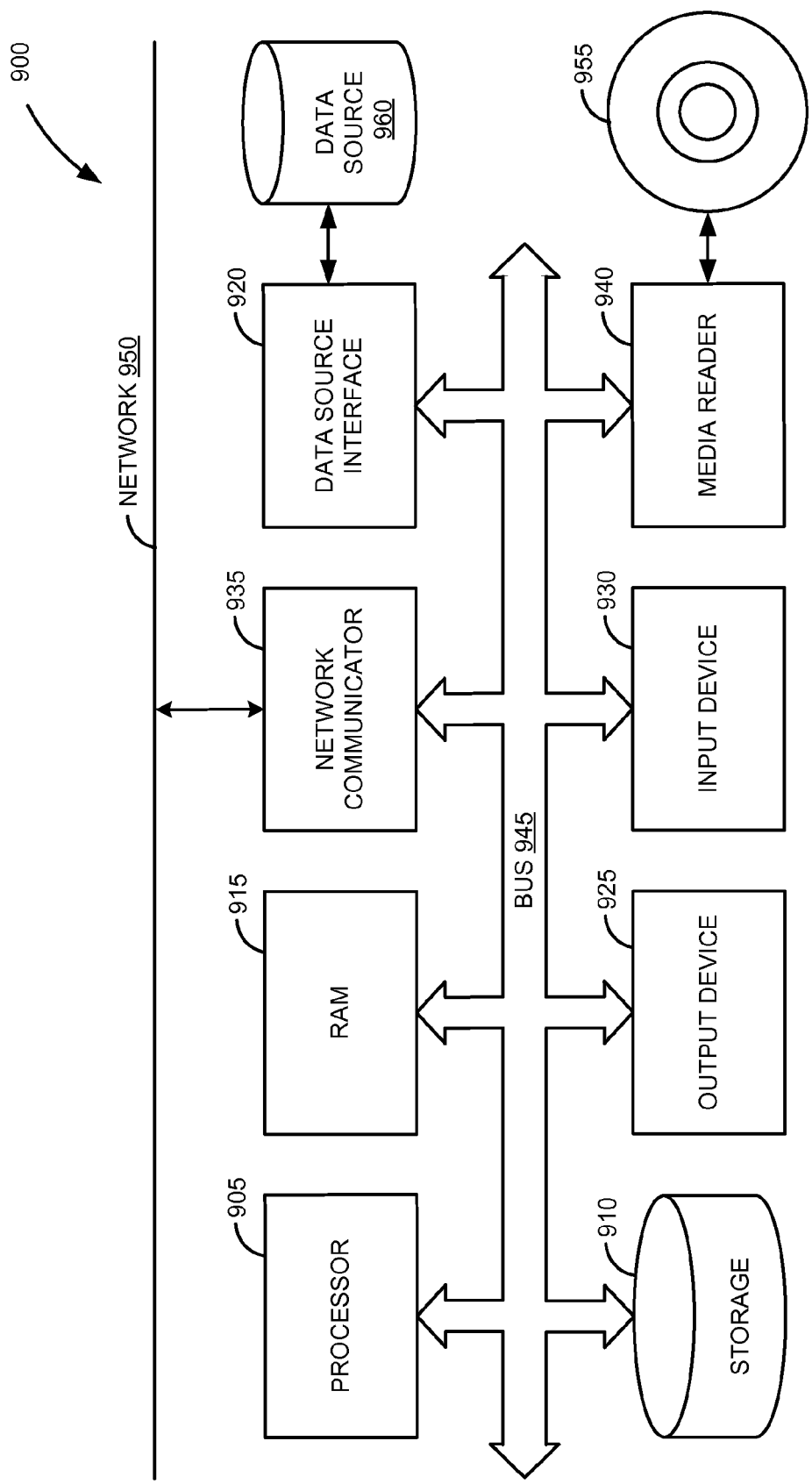
FIG. 9 is a block diagram illustrating an exemplary computer system.

FIG. 9 is a block diagram illustrating an exemplary computer system 900. The computer system 900 includes a processor 905 that executes software instructions or code stored on a computer readable storage medium 955 to perform the above-illustrated methods of the invention. The computer system 900 includes a media reader 940 to read the instructions from the computer readable storage medium 955 and store the instructions in storage 910 or in random access memory (RAM) 915. The storage 910 provides a large space for keeping static data where at least some instructions could be stored for later execution. The stored instructions may be further compiled to generate other representations of the instructions and dynamically stored in the RAM 915. The processor 905 reads instructions from the RAM 915 and performs actions as instructed. According to one embodiment of the invention, the computer system 900 further includes an output device 925 (e.g., a display) to provide at least some of the results of the execution as output including, but not limited to, visual information to users and an input device 930 to provide a user or another device with means for entering data and/or otherwise interact with the computer system 900. Each of these output 925 and input devices 930 could be joined by one or more additional peripherals to further expand the capabilities of the computer system 900. A network communicator 935 may be provided to connect the computer system 900 to a network 950 and in turn to other devices connected to the network 950 including other clients, servers, data stores, and interfaces, for instance. The modules of the computer system 900 are interconnected via a bus 945. Computer system 900 includes a data source interface 920 to access data source 960. The data source 960 can be access via one or more abstraction layers implemented in hardware or software. For example, the data source 960 may be access by network 950. In some embodiments the data source 960 may be accessed via an abstraction layer, such as, a semantic layer.

A data source 960 is an information resource. Data sources include sources of data that enable data storage and retrieval. Data sources may include databases, such as, relational, transactional, hierarchical, multi-dimensional (e.g., OLAP), object oriented databases, and the like. Further data sources include tabular data (e.g., spreadsheets, delimited text files), data tagged with a markup language (e.g., XML data), transactional data, unstructured data (e.g., text files, screen scrapings), hierarchical data (e.g., data in a file system, XML data), files, a plurality of reports, and any other data source accessible through an established protocol, such as, Open DataBase Connectivity (ODBC), produced by an underlying software system (e.g., ERP system), and the like. Data sources may also include a data source where the data is not tangibly stored or otherwise ephemeral such as data streams, broadcast data, and the like. These data sources can include associated data foundations, semantic layers, management systems, security systems and so on.

In the above description, numerous specific details are set forth to provide a thorough understanding of embodiments of the invention. One skilled in the relevant art will recognize, however that the invention can be practiced without one or more of the specific details or with other methods, components, techniques, etc. In other instances, well-known operations or structures are not shown or described in details to avoid obscuring aspects of the invention.

Although the processes illustrated and described herein include series of steps, it will be appreciated that the different embodiments of the present invention are not limited by the illustrated ordering of steps, as some steps may occur in different orders, some concurrently with other steps apart from that shown and described herein. In addition, not all illustrated steps may be required to implement a methodology in accordance with the present invention. Moreover, it will be appreciated that the processes may be implemented in association with the apparatus and systems illustrated and described herein as well as in association with other systems not illustrated.

The above descriptions and illustrations of embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize. These modifications can be made to the invention in light of the above detailed description. Rather, the scope of the invention is to be determined by the following claims, which are to be interpreted in accordance with established doctrines of claim construction.

What is claimed is:

1. A non-transitory computer readable storage medium to physically store instructions, which when executed by a computer, cause the computer to:
   receive a request to obtain a data object from a repository, the repository organized in a set of layers, each layer implemented as a file system that stores content for a solution, including a layer strategy file system, a personalization file system, a development file system, and list file system;
   provide access to the repository based on a layer strategy, wherein the layer strategy includes a definition of at least one layer from the set of layers and a definition of a sequence access to the set of layers, and wherein the layer strategy includes a first mode for runtime access and a second mode for design time access to the repository, wherein the layer strategy file system includes the personalization file system, the development file system, and the list file system when the layer strategy file system implements the first mode of the layer strategy; and
   search the set of layers of the repository for the data object based on the sequence access to the set of layers defined in the layer strategy.

2. The non-transitory computer readable storage medium of manufacture of claim 1, wherein the instructions further cause the computer to:
   forward the request to the layer strategy file system, wherein the layer strategy file system implements the layer strategy; and
   search the personalization file system for the data object.

3. The non-transitory computer readable storage medium of manufacture of claim 2, wherein the instructions further cause the computer to:
   if the data object is not found in the personalization file system, search the development file system; and
   if the data object is not found in the development file system, forward the request to the list file system, wherein the list file system includes the set of layers defined in the layer strategy.

4. The non-transitory computer readable storage medium of manufacture of claim 1, wherein the layer strategy file system includes the development file system and the list file system when the layer strategy file system implements the second mode of the layer strategy.

5. The non-transitory computer readable storage medium of manufacture of claim 1, wherein the instructions further cause the computer to:
   open the data object for editing in the personalization file system;
   edit the data object in the personalization file system; and
   activate the edited data object in the personalization file system.

6. A computerized method comprising:
   receiving a request to obtain a data object from a repository, the repository organized in a set of layers, each layer implemented as a file system that stores content for a solution, including a layer strategy file system, a personalization file system, a development file system, and list file system;
   providing access to the repository based on a layer strategy, wherein the layer strategy includes a definition of at least one layer from the set of layers and a definition of a sequence access to the set of layers, and wherein the layer strategy includes a first mode for runtime access and a second mode for design time access to the repository, wherein the layer strategy file system includes the personalization file system, the development file system, and the list file system when the layer strategy file system implements the first mode of the layer strategy; and
   searching the set of layers of the repository for the data object based on the sequence access to the set of layers defined in the layer strategy.

7. The method of claim 6, further comprising:
   forwarding the request to the layer strategy file system, wherein the layer strategy file system implements the layer strategy; and
   searching the personalization file system for the data object.

8. The method of claim 7, further comprising:
   if the data object is not found in the personalization file system, searching the development file system; and
   if the data object is not found in the development file system, forwarding the request to the list file system, wherein the list file system includes the set of layers defined in the layer strategy.

9. The method of claim 7, further comprising:
   opening the data object for editing in the personalization file system;
   editing the data object in the personalization file system; and
   activating the edited data object in the personalization file system.

10. The method of claim 6, wherein the layer strategy file system includes the development file system and the list file system when the layer strategy file system implements the second mode of the layer strategy.

11. A computing system comprising:
    a processor; and
    a memory in communication with the processor, the memory comprising:
       a repository organized in a set of layers, each layer implemented as a file system that manages content for a solution, the repository including:
          a personalization file system that stores personalization settings;
          a development file system that stores temporary content, which in response to activation is moved to a writable layer;
          a list file system that includes the set of layers, wherein the set of layers are defined in a layer strategy; and
          a layer strategy file system that implements the layer strategy, wherein the layer strategy includes a first mode for runtime access and a second mode for design time access to the repository, and wherein the layer strategy file system includes the personalization file system, the development file system, and the list file system when the layer strategy file system implements the first mode of the layer strategy.

12. The computing system of claim 11, further comprising: at least one customer file system created by the list file system in a sequence defined in the layer strategy.

13. The computing system of claim 11, wherein the layer strategy file system includes the development file system and the list file system when the layer strategy file system implements the second mode of the layer strategy.

14. The computing system of claim 11, wherein the personalization file system and the development file system are created automatically by the repository.

* * * * *